(12) United States Patent
Offer

(10) Patent No.: US 7,085,556 B2
(45) Date of Patent: Aug. 1, 2006

(54) VENDING MACHINE

(75) Inventor: Gero Offer, Gilching (DE)

(73) Assignee: Siemens AG, Munich (DE)

( * ) Notice: Subject to any disclaimer, the term of this patent is extended or adjusted under 35 U.S.C. 154(b) by 583 days.

(21) Appl. No.: 09/759,606

(22) Filed: Jan. 12, 2001

(65) Prior Publication Data

US 2001/0034566 A1 Oct. 25, 2001

(30) Foreign Application Priority Data

Jan. 12, 2000 (DE) .......................................... 100 00 948

(51) Int. Cl.
*H04M 11/10* (2006.01)
*H04M 3/42* (2006.01)

(52) U.S. Cl. .................. 455/414.1; 455/66.1; 455/90.1; 379/114.16; 235/381; 700/231

(58) Field of Classification Search ................ 455/90.1, 455/406, 414, 422, 426, 558, 575, 66.1; 379/114.05, 379/114.15, 114.16, 114.17, 144.04; 235/380, 235/381; 700/231, 232, 236
See application file for complete search history.

(56) References Cited

U.S. PATENT DOCUMENTS

| | | | | |
|---|---|---|---|---|
| 5,577,109 | A | * 11/1996 | Stimson et al. | 379/114.2 |
| 5,728,999 | A | * 3/1998 | Teicher | 235/381 |
| 5,796,832 | A | * 8/1998 | Kawan | 705/65 |
| 5,844,808 | A | * 12/1998 | Konsmo et al. | 700/244 |
| 5,901,303 | A | * 5/1999 | Chew | 711/115 |
| 5,991,749 | A | * 11/1999 | Morrill, Jr. | 705/44 |
| 5,997,928 | A | * 12/1999 | Kaish et al. | 426/418 |
| 6,038,491 | A | * 3/2000 | McGarry et al. | 700/231 |
| 6,283,367 | B1 | * 9/2001 | Matthew et al. | 235/380 |
| 6,356,752 | B1 | * 3/2002 | Griffith | 455/406 |
| 6,415,142 | B1 | * 7/2002 | Martineau | 455/411 |
| 6,424,884 | B1 | * 7/2002 | Brooke et al. | 700/232 |
| 6,462,644 | B1 | * 10/2002 | Howell et al. | 340/5.92 |
| 2004/0199474 | A1 | 10/2004 | Ritter | |

FOREIGN PATENT DOCUMENTS

| | | |
|---|---|---|
| DE | 68908 053 | 3/1990 |
| DE | 19844 677 | 2/2000 |
| JP | 08227478 | 3/1996 |
| JP | 08249530 | 9/1996 |
| WO | WO 97/14124 | 4/1997 |
| WO | WO97/30543 | 8/1997 |
| WO | WO98/33343 | 7/1998 |
| WO | WO9847112 | * 10/1998 |
| WO | WO99/00773 | 1/1999 |
| WO | WO99/22346 | 5/1999 |
| WO | WO0077697 | * 12/2000 |

OTHER PUBLICATIONS

European Search Report dated Mar. 17, 2005 EP00127111.

\* cited by examiner

*Primary Examiner*—Stephen M. D'Agosta
(74) *Attorney, Agent, or Firm*—Fish & Richardson P.C.

(57) ABSTRACT

A system includes a communications network, a first communication device connected to the communications network, and a vending machine. The vending machine includes a retrieving device for obtaining a product from the vending machine, a second communication device connected to the communications network, and a dispensing device for dispensing the product from the vending machine. The first and second communication devices establish a connection via the communications network. The connection enables the retrieving device and the dispensing device.

22 Claims, 1 Drawing Sheet

VENDING MACHINE

CLAIM TO PRIORITY

This application claims priority under 35 U.S.C. § 119 from German Patent Application No. DE 10000948.4, filed on Jan. 12, 2000.

BACKGROUND

This invention relates to a method and apparatus for dispensing products, including goods and services, from a vending machine.

A vending machine accepts money and, in return, dispenses goods or services, such as beverages, candy, or other everyday items. Currently, vending machines accept either exact change or, in some cases, paper currency or credit/debit cards. Amounts in excess of the purchase price are typically refunded via a change dispenser.

SUMMARY

In general, in one aspect, the invention is directed to dispensing a product from a vending machine. This aspect of the invention includes receiving a signal from a cellular telephone, issuing a response to the signal which indicates that a connection has been established between the cellular telephone and the vending machine, receiving information indicating that the product has been selected, and dispensing the product in response to the information when the connection has been established.

The invention thus permits the cashless utilization of vending machines via a communications service, such as a cellular telephone. As a result, vending machines can be used more widely than in the past. The invention also opens up additional potential for vending machines to sell products, meaning goods and/or services, that have not previously been marketed via that route or have only been marketed to a limited extent. The invention also reduces the cost of vending machines by reducing the need for expensive, high-maintenance systems for accepting and authenticating banknotes, making change, and employing credit card readers or debit card readers.

This aspect of the invention may also include one or more of the following. The vending machine outputs the cost of the product and that cost is debited from an account to pay for the product. The response indicating that a connection has been established is a visual indication that is displayed on the cellular telephone and/or an audio indication that is presented via the cellular telephone. The response is received and the signal is issued over a mobile communications network. The amount of inventory in the vending machine is monitored and an indication is output when the vending machine is out of a product.

In general, in another aspect, the invention is directed to an apparatus for dispensing a product. This aspect of the invention features a transceiver, which receives a signal from a cellular telephone and issues a response to the signal. The response indicates that a connection has been established between the cellular telephone and the vending machine. This aspect of the invention also features a retrieving device which receives information indicative of the product, and a dispensing device which dispenses the product in response to the information and when the connection has been established.

In general, in another aspect, the invention is directed to a system that includes a communications network, a first communication device connected to the communications network, and a vending machine. The vending machine includes a retrieving device for obtaining a product from the vending machine, a second communication device connected to the communications network, and a dispensing device for dispensing the product from the vending machine. The first and second communication devices establish a connection via the communications network. The connection between the first and second communication devices enables the retrieving device and the dispensing device.

This aspect may include one or more of the following features. The first communication device is a telephone, such as a cellular telephone or a conventional telephone. The second communication device is a transmitter/receiver (i.e., a "transceiver"). The network is a mobile radio network or a conventional telephone network and a gateway server that connects the vending machine to the telephone network. A code number is associated with the vending machine. The first communication device establishes the connection to the second communication device using the code number. The vending machine includes an inventory monitoring system for monitoring the inventory of the product and outputting a signal when the vending machine is out of the product. A peripheral device receives a signal from the second communication device and generates a menu in response to the signal.

The details of one or more embodiments of the invention are set forth in the accompanying drawing and the description below. Other features, objects, and advantages of the invention are apparent from the description, drawing, and claims.

DETAILED DESCRIPTION

Figure 1:
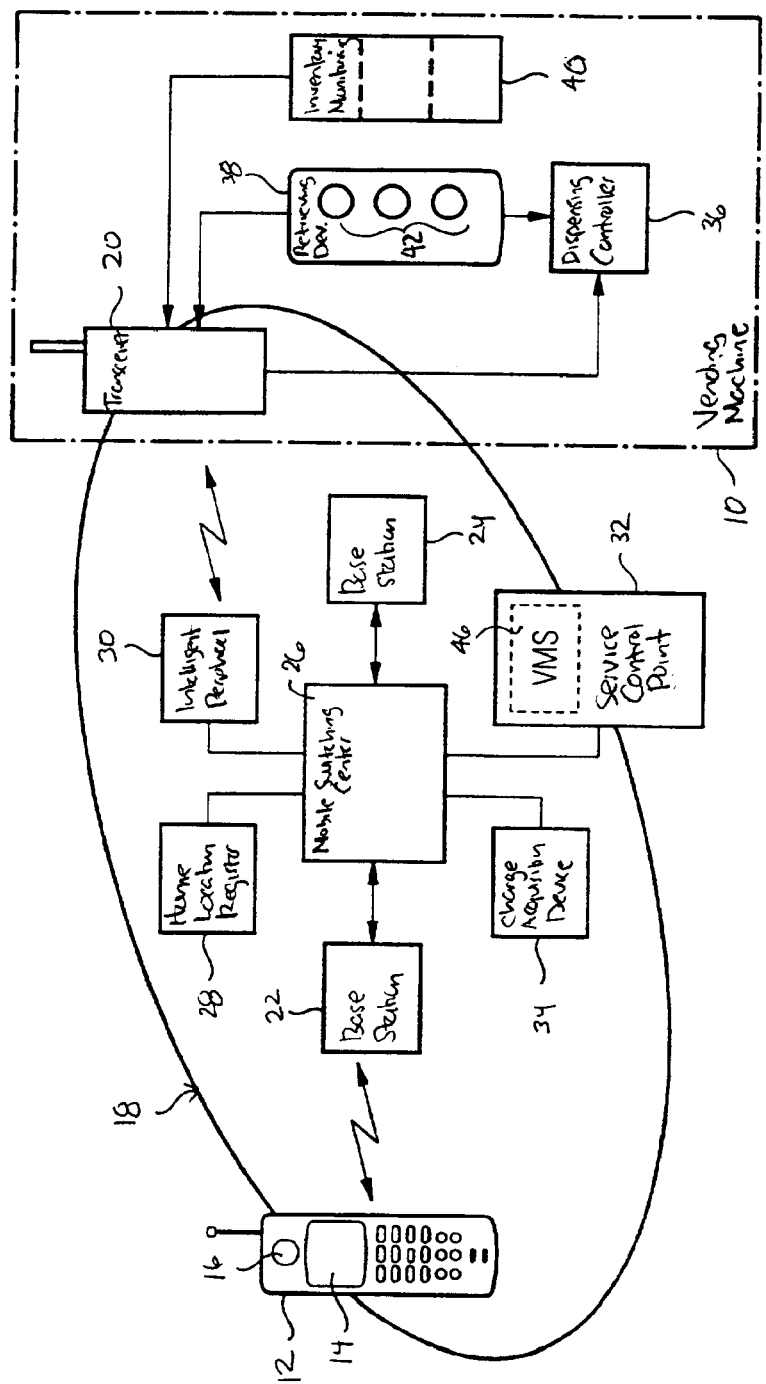
FIG. 1 is a view of a system containing a cellular telephone, a mobile network, and a vending machine according to one embodiment of the invention.

Referring to FIG. 1, a network is shown, which includes vending machine 10 and accompanying hardware. Vending machine 10 dispenses products in response to a signal received from a cellular telephone 12 or other communication device, such as a conventional telephone. By dispensing products in this manner, the need for cash or cards is eliminated, thus making it possible for buyers to purchase products more easily.

Cellular telephone 12 is a conventional cellular telephone that includes a display 14 and a receiver 16, among other things. Cellular telephone 12 is part of a mobile radio network 18, which links cellular telephone 12 to a communication device, in this case transceiver (transmitter/receiver) 20 in vending machine 10. This link is created using a base station 22 that communicates with cellular telephone 12, a base station 24 that communicates with transceiver 20, and a mobile switching center (or service switching point) 26 through which base stations 22 and 24 communicate. All communications set forth herein are bi-directional unless otherwise indicated. The means of communication may be via one or more of RF (radio frequency), microwave, or any other type of wireless or wired medium. Mobile switching center 26 and base stations 22 and 24 are mainframe computers, personal computers (PCs) or any other type of processing device that is capable of receiving and transporting wireless and/or wired communications.

Also in communication with mobile switching center 26 are a home location register 28 for registering users, an intelligent peripheral 30, a service control point (service management point) 32, and a charge acquisition/cost acquisition device 34. Service control point 32 screens calls from cellular telephone 12 and enables cellular telephone 12 to communicate with vending machine 10. Service control point 32 is a router, mainframe computer, PC or any other type of processing device that is capable of receiving and transporting wireless and/or wired communications. The functions of service control point 32, mobile switching center 26, and base stations 22 and 24 may be implemented in one or more physical devices. Intelligent peripheral 30 is a computer or any other type of processing device that is capable of interpreting and executing commands and displaying information to a buyer either audibly or visually. It is noted that communications may be routed between transceiver 20 and intelligent peripheral 20 in lieu of, or in addition to, base station 24.

In addition to transceiver 20, vending machine 10 also includes a dispensing control device 36, a retrieving device 38, and an inventory monitoring system 40, all of which are in communication with transceiver 20. These may be implemented as hardware, software, or a combination of the two, e.g., an application-specific integrated circuit (ASIC), a field programmable gate array (FPGA), logic gates, and/or machine-executable instructions running on a processor within vending machine 10.

Retrieving device 38 includes buttons 42, which may be numbers, letters or the like. Buttons 42 are pressed by a buyer to select various, differently-priced products in vending machine 10. Dispensing control device 36 dispenses products identified using the buttons on retrieving device 38. Inventory monitoring system 40 monitors the inventory of the products as they are dispensed by dispensing device 36, and provides an indication to transceiver 20 when there is no more of a product available for sale.

Vending machine 10 operates as follows.

Vending machine 10 displays a telephone number, preferably a flexible premium-rate number which includes a general service number and a code number that is unique to the vending machine. In this context, a flexible premium-rate number does not have a fixed charged associated with it. A buyer telephones the number displayed on vending machine 10 using cellular telephone 12. The resulting telephone call is routed through network 18 to transceiver 20 in vending machine 10. In network 18, vending machine service (VMS) 46 receives the telephone call from mobile switching center 26 and verifies the number being called against numbers in memory (not shown). VMS may comprise circuitry and software on service control point 32

If VMS 46 verifies the telephone call, service control point 32 issues a command to intelligent peripheral 30 indicating acceptance of the call and instructing intelligent peripheral 32 to generate an audible (or "acoustic") menu for selecting products in the vending machine. If VMS 46 rejects the telephone call (i.e., the telephone call is not verified), VMS 46 issues a command to intelligent peripheral 30 to generate a message indicating that the buyer is not authorized to use vending machine 10. Alternatively, no message may be provided to indicate that the buyer is not authorized.

The audible menu or message is presented by intelligent peripheral 30 in this embodiment. However, in alternative embodiments, intelligent peripheral 30 may not be used. In these alternative embodiments, vending machine 10 itself performs the functions of intelligent peripheral 30. That is, vending machine 10 receives the commands, generates the audible menu or message, and outputs them to the buyer. In this case, a processor (not shown) is provided in vending machine 10 to perform these functions.

If the telephone call is not authorized by VMS 46, or the buyer terminates the transaction (e.g., by hanging up the call), call routing to transceiver 20 is interrupted. If the telephone call is authorized, VMS 46 converts the flexible premium rate number into a call number for transmission to transceiver 20 via mobile switching center 26. Mobile switching center 26 transmits the call number to transceiver 20 via base station 24, intelligent peripheral 30, or a combination of the two.

Transceiver 20 accepts the call if it has not received a signal from inventory monitoring system 40 indicating that there are no more products in vending machine 10. In this regard, if there are no more products available, vending machine 10 provides an indication (e.g., on an optical display (not shown) or on intelligent peripheral 30) that there are no more products available for sale. In addition to, or instead of, this message on vending machine 10, VMS 46 may also provide the buyer directly with an indication that there are no more products for sale.

When a connection is established between cellular telephone 12 and transceiver 20 (i.e., once transceiver 20 accepts the call from cellular telephone 12), transceiver 20 provides an indication that the connection has been established to cellular telephone 12 via one or more of intelligent peripheral 30, base station 24, mobile switching center 26 and base station 22. The indication may be visual, in which case it is displayed on display 14 of cellular telephone 12. The indication may be audible, in which case the indication is presented to the buyer via receiver 16 of cellular telephone 12. The connection enables the vending machine in the sense that the product cannot be dispensed through the use of cellular telephone 12 without first establishing the connection.

At this point, vending machine 10 instructs the buyer to select a product. The buyer may also be instructed via a message on cellular telephone 12. To select a product, the buyer presses the appropriate button(s) 42 on retrieving device 38. The buttons allow the buyer to enter a code number that corresponds to the product. In response, retrieving device 38 sends a signal to dispensing control device 36 and to transceiver 20. Dispensing control device 36 dispenses the identified product, e.g., via a chute or the like (not shown) in vending machine 10. Alternatively, the buyer may select a product via the menu on intelligent peripheral 30. The signal sent to transceiver 20 by retrieving device 38 is for payment purposes. That is, the signal identifies the product that was purchased so that transceiver 20 can initiate payment for the product.

The cost of the purchased product (the "price signal") is obtained and transmitted by transceiver 20 to service control point 32 via intelligent peripheral 30/base station 24, and mobile switching center 26. Payment for the product may be debited from a prepaid account owned by the buyer. Additionally, the charges for the cellular telephone call to the vending machine may also be deducted from this prepaid account.

In more detail, retrieving device 38 generates the price signal and transceiver 20 transmits that price signal to service control point 32. Logic circuits (not shown) in VMS 46 generate a ticket, which is later evaluated by charge-acquisition/cost-acquisition device 34. If the product is dispensed successfully, the cost of the product and any associated telephone charges are debited from the prepaid account which, in this embodiment, is maintained by a system administrator in a memory (not shown) of charge-acquisition/cost-acquisition device 34. A product is considered successfully dispensed when dispensing control device 36 receives a signal from retrieving device 38 indicating that retrieving device 38 has been actuated and the product has actually been dispensed. If the product is not dispensed successfully, the buyer's account is not debited.

The amount of money in the prepaid account is maintained by a system administrator. Credit cards, cash, checks or the like may be used to find the account. Accounts may also be maintained for the product supplier and debited accordingly.

The signal generated by retrieving device 38 may also be used for accounting and other evaluation purposes (e.g., for statistical analyses of product preferences, customer behavior, and the like). The signal may also be used to track remaining product inventory in vending machine 10 so that vending machine 10 can be re-supplied as necessary.

Thus, the arrangement of FIG. 1 provides a system for dispensing a product or service through the use of a terminal device, which places no special demands on the terminal device and is easy to manipulate by the buyer.

The invention is not limited to the embodiments described herein. For example, the invention is not limited to a mobile radio network or to vending machines that dispense goods. The invention can be applied to vending machines, kiosks, or other devices that provide information and services. For example, in another embodiment, the "retrieving device" may be located at a first terminal device, such as a computer or other processing device, if there is no physically accessible vending machine. In this case, the "retrieving device" is essentially a selection menu and the "vending machine" is an access or output control system of a database that is accessed via the first terminal device.

As noted above, transceiver 20 may be a mobile radio terminal device, in which case the communications network structure is the mobile radio network or linkage of various mobile radio networks shown in FIG. 1. Alternatively, vending machine may be accessed via a conventional telephone network or data network terminal device, and the mobile radio network may be linked thereto via a gateway server to a conventional-telephone or data network within which the terminal device of the vending machine operates. In this embodiment, the conventional telephone network is an intelligent network having the functionality described with respect to FIG. 1.

In general, the communications network structure could include a central server or intelligent network, which controls the dispensing process for the product or service to which a service number is assigned. Associated with each individual vending machine in the network is an individual code number or network address which is either identified at the machine (in the case of hard goods) or made known through the usual media (for services and information providers) and which, during the ordering process, is entered by the prospective buyer via the mobile radio terminal device.

In another embodiment, entry of the individual code number, or network address in the case that the vending machine is a computer, occurs automatically when the retrieving device at is actuated.

Other embodiments not specifically described herein are also within the scope of the following claims.

What is claimed is:

1. A method of dispensing a product from a vending machine using a cellular telephone, the vending machine comprising (a) a retrieving device for obtaining a product from the vending machine, (b) a communication device connected to a communication network, and (c) a dispensing device for dispensing the product from the vending machine, the method comprising:
   receiving, at the communication device at a start of the method, a signal that corresponds to a call from the cellular telephone, the signal for establishing a network connection between the communication device and the cellular telephone, where the network connection can be established only if there is product in the vending machine to be dispensed;
   issuing a response message from the communication device in reply to the signal, the response message indicating that the network connection has been established;
   outputting an audible message for use in selecting the product from the vending machine, the audible message comprising a menu;
   receiving, at the retrieving device, information indicating that the product has been selected following output of the audible message; and
   dispensing the product via the dispensing device based on the information.

2. The method of claim 1, further comprising:
   outputting a cost of the product from the vending machine; and
   debiting an account for the cost to pay for the product.

3. The method of claim 1, wherein the response message comprises a visual indication that is displayed on the cellular telephone.

4. The method of claim 1, wherein the response message is audible and is presented via the cellular telephone.

5. The method of claim 1, wherein the communication network comprises a mobile communications network.

6. The method of claim 1, further comprising:
   monitoring an amount of the product in the vending machine; and
   outputting an indication when the vending machine is out of a product.

7. An apparatus for dispensing a product, comprising:
   a transceiver which receives a signal that corresponds to a call from a cellular telephone, the signal for establishing a network connection between the transceiver and the cellular telephone, where the network connection can be established only if there is product in the apparatus that can be dispensed, the transceiver issuing a response message in reply to the signal, the response message indicating that the network connection has been established;
   a retrieving device which receives information indicative of the product after the network connection has been established, and which generates an output signal based on the information; and
   a dispensing device which dispenses the product in response to the output signal;
   wherein the retrieving device receives the information via the cellular telephone or via the apparatus following output of an audible menu.

8. The apparatus of claim 7, wherein the transceiver outputs a cost of the product.

9. The apparatus of claim 7, wherein the response message comprises a visual indication for display on the cellular telephone.

10. The apparatus of claim 7, wherein the response message is audible and is presented via the cellular telephone.

11. The apparatus of claim 7, wherein the network connection is via a mobile communications network.

12. The apparatus of claim 7, further comprising:
an inventory monitoring device which monitors an amount of the product in the apparatus and which generates an output signal indicating that the apparatus is out of the product.

13. The apparatus of claim 7, wherein the apparatus comprises a vending machine.

14. A system comprising:
a first communication device connected to a communications network; and
a vending machine comprising:
  a retrieving device for obtaining a product from the vending machine;
  a second communication device connected to the communications network; and
  a dispensing device for dispensing the product from the vending machine;
wherein the first communication device initiates a call to the second communication device over the communications network, the call corresponding to a signal for establishing a network connection between the first communication device and the second communication device, where the network connection can established only if there is product in the vending machine to be dispensed;
wherein the second communication device issues a response message in reply to the signal, the response message indicating that the network connection has been established;
wherein the retrieving device receives information indicative of the product and generates an output signal based on the information;
wherein the dispensing device dispenses the product in response to the output signal, and
wherein the retrieving device receives the information via the first communication device or via the vending machine following output of an audible menu.

15. The system of claim 14, wherein the first communication device comprises a telephone.

16. The system of claim 15, wherein the telephone comprises a cellular telephone.

17. The system of claim 14, wherein the second communication device comprises a transceiver.

18. The system of claim 14, wherein the communications network comprises a mobile radio network.

19. The system of claim 14, wherein the communications network comprises:
a telephone network; and
a gateway server that connects the vending machine to the telephone network.

20. The system of claim 14, wherein a code number is associated with the vending machine and the first communication device establishes the network connection to the second communication device using the code number.

21. The system of claim 14, wherein the vending machine further comprises an inventory monitoring system for monitoring the inventory of the product.

22. The system of claim 21, wherein the inventory monitoring system outputs a signal when the vending machine is out of the product.

* * * * *